US007715406B2

(12) United States Patent
Franzen

(10) Patent No.: US 7,715,406 B2
(45) Date of Patent: May 11, 2010

(54) METHOD AND SYSTEM FOR APPORTIONING CHANNELS IN A PROGRAMMABLE MULTI-SOURCE, MULTI-DESTINATION SYSTEM

(75) Inventor: Kendrick Owen Daniel Franzen, Somerville, MA (US)

(73) Assignee: Analog Devices, Inc., Norwood, MA (US)

( * ) Notice: Subject to any disclaimer, the term of this patent is extended or adjusted under 35 U.S.C. 154(b) by 352 days.

(21) Appl. No.: 11/821,635

(22) Filed: Jun. 25, 2007

(65) Prior Publication Data

US 2008/0317034 A1 Dec. 25, 2008

(51) Int. Cl.
*H04L 12/28* (2006.01)
*H04L 12/56* (2006.01)

(52) U.S. Cl. .................................................. 370/395.1

(58) Field of Classification Search ................. 370/432, 370/468, 400, 359, 384, 360, 376, 341, 394, 370/396, 429, 412, 471, 229, 218, 238, 395; 709/246, 218; 715/748; 710/107; 398/67; 455/3; 379/221, 276; 348/398, 397
See application file for complete search history.

(56) References Cited

U.S. PATENT DOCUMENTS

| | | | | |
|---|---|---|---|---|
| 5,603,043 | A | 2/1997 | Taylor et al. | |
| 5,774,244 | A * | 6/1998 | Tandon et al. | 398/67 |
| 6,434,649 | B1 * | 8/2002 | Baker et al. | 710/107 |
| 2005/0135376 | A1 | 6/2005 | Bae et al. | |
| 2005/0240688 | A1 | 10/2005 | Moerman et al. | |
| 2006/0233145 | A1 * | 10/2006 | Jang et al. | 370/341 |
| 2008/0318518 | A1 * | 12/2008 | Coutinho et al. | 455/3.06 |

* cited by examiner

*Primary Examiner*—Hong Cho
*Assistant Examiner*—Prenell P Jones
(74) *Attorney, Agent, or Firm*—Kenyon & Kenyon LLP

(57) ABSTRACT

This invention further features a method of apportioning channels in a programmable multi-source, multi-destination system, the method including determining the source for each channel by: a) computing the sum of the number of channels carried by the current and all preceding sources, b) computing a source identifier for each channel based on the computed sum of the number of channels carried by the current and all preceding sources, determining which section of the source the channel is located based on the computed source identifier, and determining the destination for each channel by: a) computing the sum of the number of channels carried by the current and all preceding destinations, and b) computing a destination identifier of the first channel sent to each destination based on the computed sum of the number of channels carried by the current and all preceding destinations.

15 Claims, 4 Drawing Sheets

METHOD AND SYSTEM FOR APPORTIONING CHANNELS IN A PROGRAMMABLE MULTI-SOURCE, MULTI-DESTINATION SYSTEM

FIELD OF THE INVENTION

This invention relates to a method of apportioning channels in a programmable multi-source, multi-destination system.

BACKGROUND OF THE INVENTION

Programmable multi-source, multi-destination systems typically include a large number of channels which originate from multiple sources and are mapped to multiple destinations. For example, an audio system in a vehicle may include 24 channels that receive signals from multiple sources, such as a CD/DVD drive, a radio (e.g., AM/FM/satellite), and a telecom system (e.g., Bluetooth® or analog phone). The output signals from these sources can be sent to various destinations, such as multiple speakers where each speaker can have a different audio content. Each source and destination of these systems can carry multiple channels; each channel being carried on an exclusive section of the source or destination (e.g., section 0, section 1, . . . ). If each source and destination always carried the same number of channels, then mapping the channels from their sources to their destinations would be simple. However, in practice, the number of channels carried by any particular source and/or destination is programmable by the end user and varies according to the user specifications.

Therefore, to automatically map multiple channels from their sources to their destinations, each channel (of these systems) needs to identify its source and exclusive section on that source and its destination and exclusive section on that destination.

SUMMARY OF THE INVENTION

It is therefore an object of this invention to provide a method and system for apportioning channels in a programmable multi-source, multi-destination system.

It is a further object of this invention to provide such a method and system which determines the source and section of the source for each channel in the system.

It is a further object of this invention to provide such a method and system which determines the destination and section of the destination for each channel in the system.

It is a further object of this invention to provide such a method and system which maps contiguous channels of the system from its sources to its destinations.

The subject invention results from the realization that a method and system for apportioning channels in a programmable multi-source, multi-destination system which maps each channel from its source to its destination is effected, in one embodiment, by 1) determining the source for each channel by: a) computing the sum of the number of channels carried by the current and all preceding sources, and b) computing a source identifier for each channel based on the computed sum of the number of channels carried by the current and all preceding sources; 2) determining which section of the source the channel is located based on the computed source identifier; and 3) determining the destination for each channel by: a) computing the sum of the number of channels carried by the current and all preceding destinations, and b) computing the destination identifier by identifying the first channel sent to each destination based on the computed sum of the number of channels carried by the current and all preceding destinations.

This subject invention features a method of apportioning channels in a programmable multi-source, multi-destination system, the method including determining the source for each channel by: a) computing the sum of the number of channels carried by the current and all preceding sources, b) computing a source identifier for each channel based on the computed sum of the number of channels carried by the current and all preceding sources, determining which section of the source the channel is located based on the computed source identifier, and determining the destination for each channel by: a) computing the sum of the number of channels carried by the current and all preceding destinations, and b) computing a destination identifier of the first channel sent to each destination based on the computed sum of the number of channels carried by the current and all preceding destinations.

In a preferred embodiment, the method may be implemented on a processor. The method may be implemented on an audio DSP processor. The method may be implemented on an ASIC. The ASIC may be designed using a hardware description language. The ASIC and/or the audio DSP may be programmed using a programming language.

This invention also features a method of apportioning channels in a programmable multi-source, multi-destination system, the method including determining the source for each channel by: a) computing the sum of the number of channels carried by the current and all preceding sources, b) computing a source identifier for each channel based on the computed sum of the number of channels carried by the current and all preceding sources, and determining which section of the source the channel is located based on the computed source identifier.

This invention further features a method of apportioning channels in a programmable multi-source, multi-destination system, the method including determining the destination for each channel by: a) computing the sum of the number of channels carried by the current and all preceding destinations, and b) computing a destination identifier of the first channel sent to each destination based on the computed sum of the number of channels carried by the current and all preceding destinations.

This invention also features a system for apportioning channels in a programmable multi-source, multi-destination system including a processor configured to determine the source for each channel by: a) computing the sum of the number of channels carried by the current and all preceding sources, b) computing a source identifier for each channel based on the computed sum of the number of channels carried by the current and all preceding sources, determine which section of the source the channel is located based on the computed source identifier, and determine the destination for each channel by: a) computing the sum of the number of channels carried by the current and all preceding destinations, and b) computing a destination identifier of the first channel sent to each destination based on the computed sum of the number of channels carried by the current and all preceding destinations.

The processor may include an ASIC. The ASIC may include an audio DSP processor. The ASIC may be designed using a hardware description language. The audio DSP may be designed using a programming language.

This invention also features a system of apportioning channels in a programmable multi-source, multi-destination system including a processor configured to determine the source for each channel by: a) computing the sum of the number of channels carried by the current and all preceding sources, b) computing a source identifier for each channel based on the computed sum of the number of channels carried by the current and all preceding sources, and determine which section of the source the channel is located based on the computed source identifier.

This invention further features a system for apportioning channels in a programmable multi-source, multi-destination system including a processor configured to determine the destination for each channel by: a) compute the sum of the number of channels carried by the current and all preceding destinations, and b) compute a destination identifier of the first channel sent to each destination based on the computed sum of the number of channels carried by the current and all preceding destinations.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
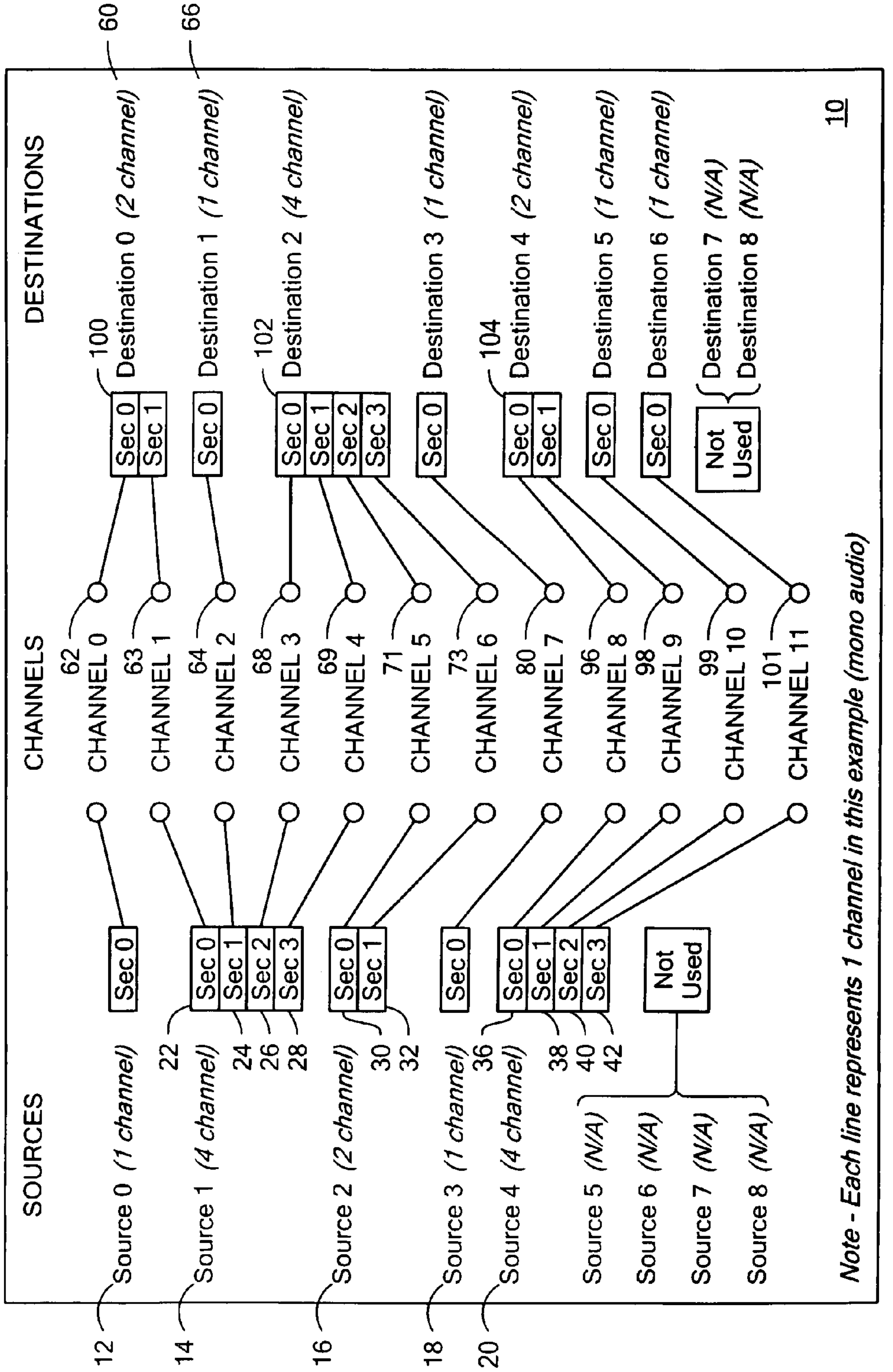
FIG. 1 is a schematic block diagram showing an example of a programmable multi-source, multi-destination system in which the channels are automatically mapped from their sources to their destinations in accordance with a method of apportioning channels in accordance with this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, programmable multi-source, multi-destination systems, such as audio chips and the like, may include a large number of channels, e.g., 24 audio channels, which receive signals from multiple sources, such as a CD/DVD drive, a radio (e.g., AM/FM/satellite), and a telecom system (e.g., Bluetooth® or analog phone) that are sent to multiple destinations, e.g., multiple speakers where each speaker can have a different audio content. For example, programmable multi-source, multi-destination system 10, FIG. 1 includes twelve channels, channels 0-11. System 10 also includes nine sources, sources 0-8, and nine destinations, destinations 0-8. In this example, source 0, indicated at 12, carries one channel, e.g., channel 0, therefore channel 0 receives its data from source 0. Source 1, indicated at 14, carries four channels, e.g., channels 1, 2, 3, and 4, therefore channels 1, 2, 3 and 4 receive their data from source 1. Source 2, indicated at 16, carries two channels, e.g., channels 5 and 6, therefore channels 5 and 6 receive their data from source 2. Source 3, indicated at 18, carries one channel, e.g., channel 7, therefore channel 7 receives its data from source 3. Source 4, indicated at 20, carries four channels, e.g., channels 8, 9, 10, and 11 therefore channels 8, 9, 10, and 11 receive their data from source 4.

In this example, sources 1, 2, and 4 each carry more than one channel, each channel being carried on a specific section of its source. Source 1 carries four channels and therefore has four sections: section 0, indicated at 22, section 1, indicated at 24, section 2, indicated at 26, and section 3, indicated at 28. Similarly, source 2 has 2 sections, 0 and 1, indicated at 30 and 32, respectively. Source 4 has four sections, 0, 1, 2, and 3 indicated at 36, 38, 40, and 42, respectively. Source 0 and Source 3 each carry one channel, indicated at 21 and 34.

Destinations also carry or receive more than one channel. For system 10, destination 0, indicated at 60, carries 2 channels, therefore data from channels 0 and channel 1 are sent to destination 0. Destination 1, indicated at 66, carries 1 channel, therefore, data from channel 2 are sent to destination 1. Destination 2, indicated at 70, carries 4 channels, therefore data from channels 3, 4, 5, and 6 are sent to destination 2. Destination 3, indicated at 80, carries 1 channel, therefore data from channel 7 are sent to destination 3. Destination 4, indicated at 84, carries 2 channels, therefore data from channels 8 and 9 are sent to destination 4. Destination 5, indicated at 90, carries 1 channel, therefore data from channel 10 are sent to destination 5. Destination 6, indicated at 94, carries 1 channel, therefore data from channel 11 are sent to destination 6.

Mapping channels 0-11 from sources 0-8 to destinations 0-8 would be fairly straight forward if each of sources 0-8 and destinations 0-8 always carried the same number of channels. However, in practice, the number of channels carried by any particular channel and/or destination is programmable according to end user specifications.

Figure 2:
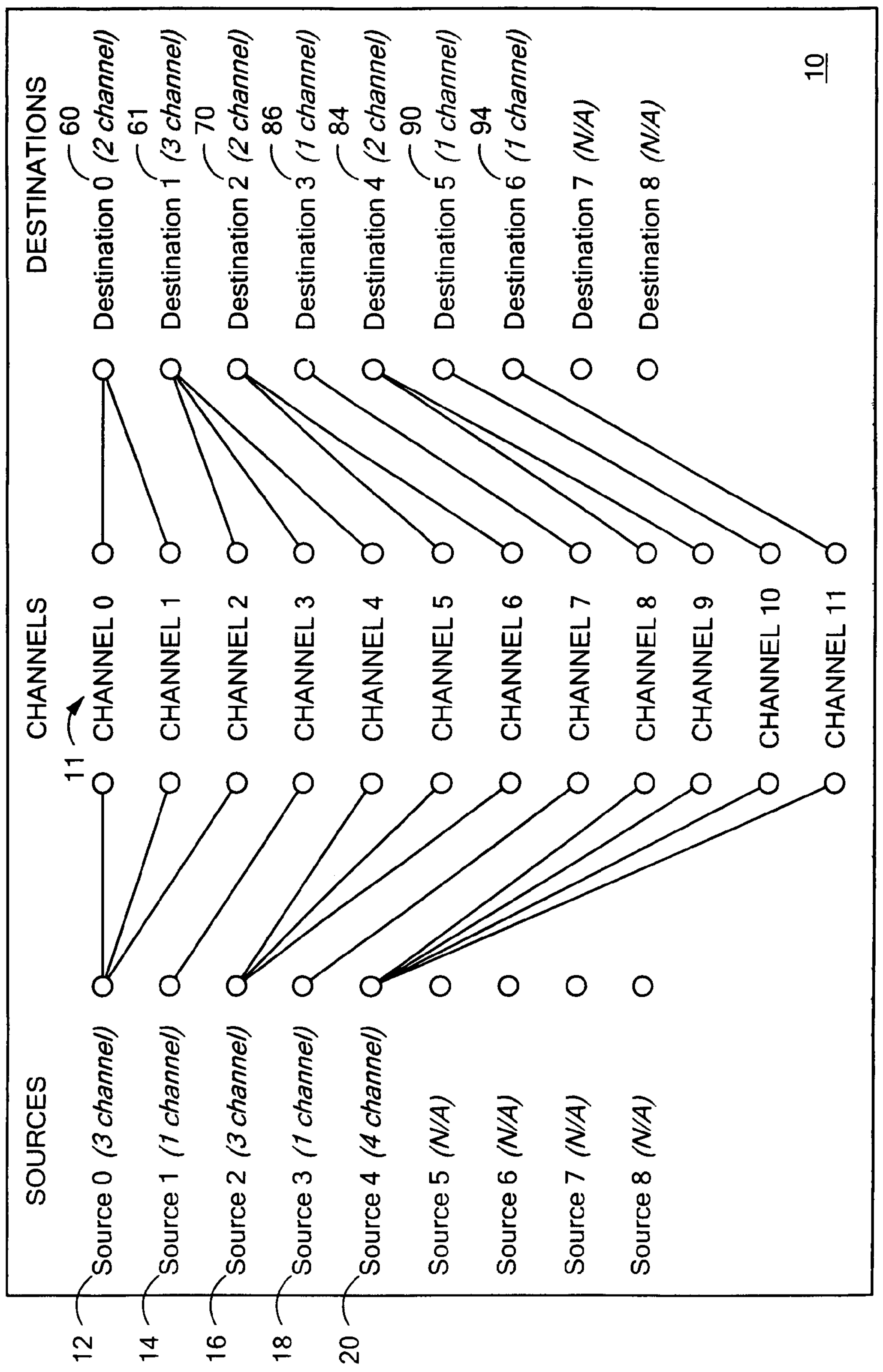
FIG. 2 is a schematic block diagram showing an exemplary alternative arrangement of the number of channels carried by sources and destinations shown in FIG. 1.

For example, FIG. 2, where like parts have been given like numbers, shows one exemplary programming change to system 10 wherein the number of channels carried by sources 0, 1, and 2 is changed. In this example, source 0 indicated at 12, now carries three channels: 0, 1, and 2. Source 1, indicated at 14, now carries channel 3. Source 2, indicated at 16, now carries three channels: 4, 5, and 6.

Similarly, the number of channels carried by a destination can be programmed to be different. In this example, destination 1, indicated at 66, now carries three channels: channels 2, 3, and 4. Destination 2, indicated at 70, now carries two channels: 5 and 6.

Therefore, mapping channels 0-11 from sources 0-8 to destinations 0-8 is a difficult task when the number of channels carried by any particular source and/or destination is settable. To date, there are no known methods or systems for accomplishing this task. This invention is a solution to this problem.

In order to properly map each of channels 0-11 to sources 0-8, an identification must be made to determine the source for each channel, known as the source identifier, and the section on that source, known as source section. For the example shown in system 10, this would yield:

TABLE 1

| Source Identifier and Source Section | | |
|---|---|---|
| Channel Number | Source Identifier | Source Section |
| Channel 0 | 0 | 0 |
| Channel 1 | 1 | 0 |
| Channel 2 | 1 | 1 |
| Channel 3 | 1 | 2 |
| Channel 4 | 1 | 3 |
| Channel 5 | 2 | 0 |
| Channel 6 | 2 | 1 |
| Channel 7 | 3 | 0 |
| Channel 8 | 4 | 0 |
| Channel 9 | 4 | 1 |
| Channel 10 | 4 | 2 |
| Channel 11 | 4 | 3 |

From Table 1 it can be seen that the data for channel 0 is carried on section 0 of source 0. The data for channel 1 is on section 0 of source 1. The data for channel 2 is on section 1 on source 1. The data for channel 3 is carried on section 2 of source 1. The data for channel 4 is on section 3 of source 1. The remaining source and section for channels 5-11 source are similarly identified as shown in Table 1 above. Therefore, to accommodate programming changes to the number of channels carried by a particular source, the source and section on that source for each channel must be determined.

Figure 3:
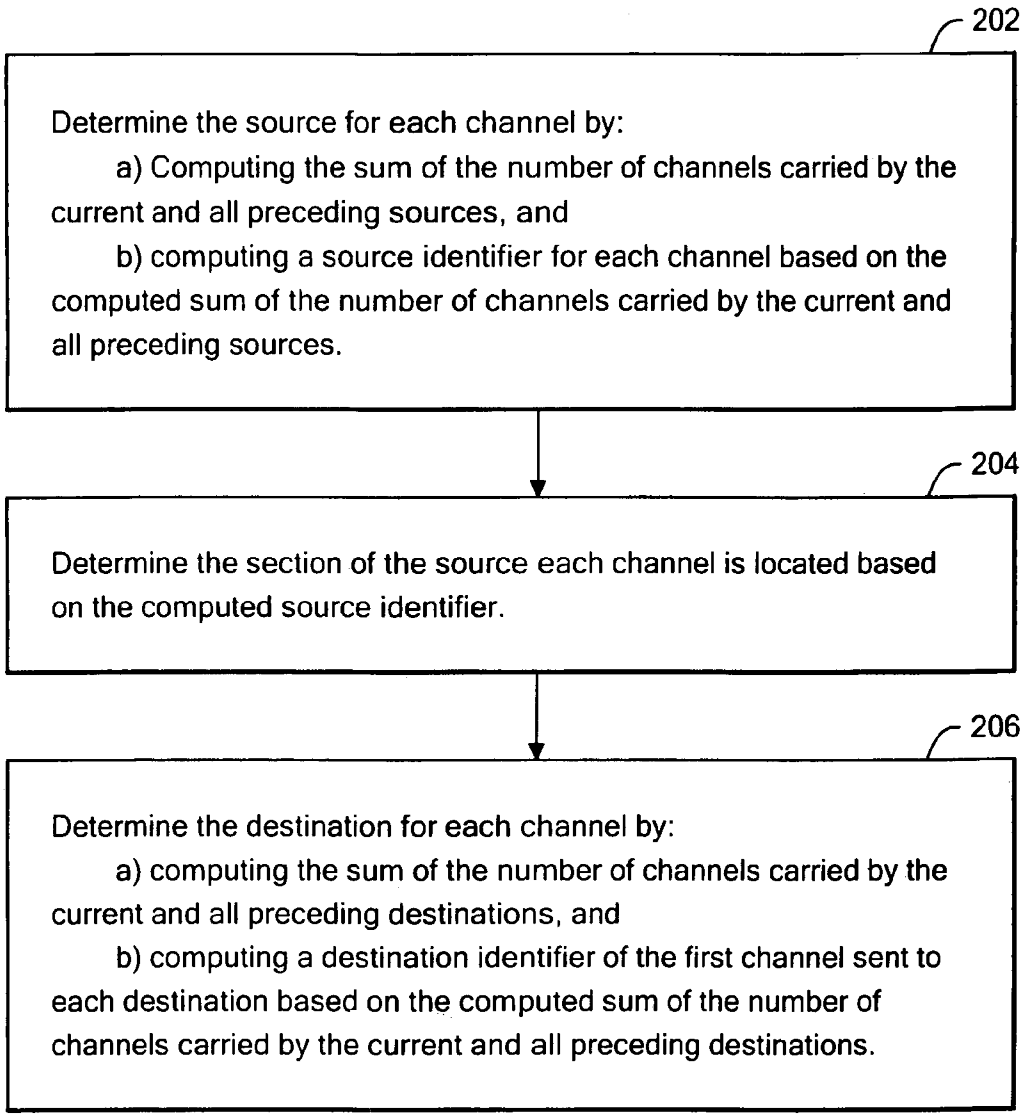
FIG. 3 is a flow chart showing one embodiment of the method of apportioning channels in a programmable multi-source, multi-destination system of this invention.

One exemplary method of apportioning channels in a programmable multi-source, multi-destination system of this invention includes steps 202, 204, and 206, FIG. 3. Step 202 includes determining the source for each channel by: a) computing the sum of the number of channels carried by the current and all preceding sources, and b) computing the source identifier for each channel based on the computed sum of the number of channels carried by the current and all preceding sources.

For system 10, FIG. 1, the computed sum of the number of channels carried by the current and all preceding sources of part a of step 202 yields:

TABLE 2

| Computed sum of channels carried by preceding sources | |
|---|---|
| Source | Computed Sum |
| S0 | 1 |
| S1 | 5 |
| S2 | 7 |
| S3 | 8 |
| S4 | 12 |
| S5 | 12 |
| S6 | 12 |
| S7 | 12 |
| S8 | 12 |

The computed source identifier for each channel determined by part b of step 202 yields:

TABLE 3

| Source Identifiers | | |
|---|---|---|
| Channel | Source Identifier | Source |
| Channel 0 | SI0 | 0 |
| Channel 1 | SI1 | 1 |
| Channel 2 | SI2 | 1 |

TABLE 3-continued

| Source Identifiers | | |
|---|---|---|
| Channel | Source Identifier | Source |
| Channel 3 | SI3 | 1 |
| Channel 4 | SI4 | 1 |
| Channel 5 | SI5 | 2 |
| Channel 6 | SI6 | 2 |
| Channel 7 | SI7 | 3 |
| Channel 8 | SI8 | 4 |
| Channel 9 | SI9 | 4 |
| Channel 10 | SI10 | 4 |
| Channel 11 | SI11 | 4 |

As shown in Table 3, the source identifier (SI), or source, for each of channels 0 through 11 has been determined by step 202: the source for channel 0 is source 0 (SI0=0), the source for channels 1 2, 3, and 4 is source 1 (SI1, SI2, SI3 and SI4=1), the source for channels 5 and 6 is source 2 (SI5 and SI6=2), the source for channel 7 is source 3 (SI7=3), and the source for channels 8, 9, 10, and 11 is source 4 (SI8, SI9, SI10 and SI11=4).

Exemplary pseudo-code for computing the sum of the number of channels carried by the current and all preceding sources of part a of step 202 is shown below:

```
Compute the sum of channels in all preceding channel sources,
including current source : S0 to S(B−1)
S0    = N0
S1    = N0 + N1
S2    = N0 + N1 + N2
...
S(B−1) = N0 +N1 + N2 + .... + N(B−1)
```

where B is the number of sources in the system, e.g., B=9 for system 10, and $N_x$ is the number of channels carried by each source. For system 10, source 0 carries one channel, therefore N0=1, source 1 carries four channels, therefore N1=4, source 2 carries two channels, therefore N2=2, source 3 carries one channel, therefore N3=1, and source 4 carries four channels, therefore N4=4. In this example, sources 5-8 are not used; therefore N5, N6, N7, and N8 do not apply.

Exemplary pseudo-code for computing the source identifier for each channel in part b of step 202 is as follows:

```
        Compute the source identifier (SI)
            SI0 to SI(A−1)
Compute SI0:
            SI0 = 0
Compute SI1:
            if(S0 > 1)          then SI1 = 0
            else if(S1 > 1 )    then SI1 = 1
            else                then SI1 = N/A
Compute SI2:
            if(S0 > 2)          then SI2 = 0
            else if(S1 > 2)     then SI2 = 1
            else if(S2 > 2)     then SI2 = 2
            else                then SI2 = N/A
        Similar logic for SI3-SI11
Compute SI(A−1):
            if(S0>(A−1))              then SI(A−1) = 0
            else if(S1>(A−1)          then SI(A−1) = 1
            else if(S2>(A−1)          then SI(A−1) = 2
            ...
            else if(S(B−1)>(A−1))     then SI(A−1) = B−1
            else                      then SI(A−1) = N/A
```

where A is the number of channels in the system, e.g., A=12 for system 10, B is the number of sources in the system, e.g., B=9 for system 10 and S0-S9 are the sums previously calculated as shown in Table 2.

Next, a determination of which section of the source each channel is located based on the computed source identifier is performed, step 204, FIG. 3. For system 10, FIG. 1, this yields:

TABLE 4

| Source Sections | | |
|---|---|---|
| Channel | Source Section 1.0 | Source Section 1 |
| Channel 0 | SS0 | 0 |
| Channel 1 | SS1 | 0 |
| Channel 2 | SS2 | 1 |
| Channel 3 | SS3 | 2 |
| Channel 4 | SS4 | 3 |
| Channel 5 | SS5 | 0 |
| Channel 6 | SS6 | 1 |
| Channel 7 | SS7 | 0 |
| Channel 8 | SS8 | 0 |
| Channel 9 | SS9 | 1 |
| Channel 10 | SS10 | 2 |
| Channel 11 | SS11 | 3 |

As shown in Table 4, the section of the source for each of channels 0-11 has been determined.

Exemplary pseudo-code for determining the section of the source each channel is located determined by step 204 is summarized below:

```
        Compute the source section (SS)
            SS0 to SS(A−1)
    Compute SS0:
            SS0 = 0
    Compute SS1:
            if(SI0 = SI1)   then SS1 = SS0 + 1
            else            then SS1 = 0
    Compute SS2:
            if(SI1 = SI2)   then SS2 = SS1 + 1
            else            then SS2 = 0
        etc.
    Compute SS(A−1):
            if(SI(A−2) = SI(A−1))   then SS(A−1) = SS(A−2) + 1
            else                    then SS(A−1) = 0
```

where SI is the source identifier previously calculated, e.g., as shown in Table 4, and A is channels in the system, e.g., A=12 for System 10, FIG. 1.

The result is the method of apportioning channels in a multi-source, multi-destination system of this invention has mapped the source and section of the source to each of the contiguous channels 0-11, FIG. 1. In this example, as shown in Tables 3 and 4, the method of apportioning channels has determined that channel 0 receives its data from section 0 of source 0 indicated at 21, FIG. 1. Channel 1 receives its data from section 0 of source 1, indicated at 22. Channel 2 receives its data from section 1 of source 1, indicated at 24. Channel 3 receives its data from section 2 of source 1, indicated at 26. Channel 4 receives its data from section 3 of source 1, indicated at 28. Channel 5 receives its data from section 0 of source 2, indicated at 30. Channel 6 receives its data from section 1 of source 2, indicated at 32. Channel 7 receives its data from section 0 of source 3, indicated at 34. Channel 8 receives its data from section 0 of source 4, indicated at 36. Channel 9 receives its data from section 1 of source 4, indicated at 38. Channel 10 receives its data from section 2 of source 4, indicated at 40. Channel 11 receives its data from section 3 of source 4, indicated at 42.

Therefore, the method of apportioning channels in a programmable multi-source, multi-destination system of this invention can automatically accommodate a settable number of channels carried by a particular source, e.g., the changes shown for system 10 as discussed above in reference to FIG. 2. In this case, the method of apportioning channels of this invention which will determine the source and the section of that source for each of channels 0-11 is similar as discussed above.

Channels are distributed to destinations in ascending numerical order. Therefore, in order to map destinations 0-8 to channels 0-11, an identification must be made of the position of the first channel sent to each of channel destinations 0-8, known as the destination identifier. Table 5 below summarizes the channel destinations 0-8 and their destination identifiers:

TABLE 5

| Destination Identifiers | |
|---|---|
| Channel destination | Destination Identifier |
| Channel Destination 0 | 0 |
| Channel Destination 1 | 2 |
| Channel Destination 2 | 3 |
| Channel Destination 3 | 7 |
| Channel Destination 4 | 8 |
| Channel Destination 5 | 10 |
| Channel Destination 6 | 11 |
| Channel Destination 7 | N/A |
| Channel Destination 8 | N/A |

As shown in Table 5 and in FIG. 1, destination 0 receives its first channel from channel 0, destination 1 receives its first channel from channel 2, destination 2 receives its first channel from channel 3, destination 3 receives its first channel from channel 7, destination 4 receives its first channel from channel 8, destination 5 receives its first channel from channel 10, and destination 6 receives its first channel from channel 11. However, if the number of channels carried by any particular destination is programmed to be different, e.g., as discussed above in reference to FIG. 2, the destination identifier will change.

The method of apportioning channels in a multi-source, multi-destination system of this invention also preferably includes determining the destination for each channel by: a) computing the sum of the number of channels carried by the current and all preceding destinations and b) computing a destination identifier of the first channel sent to each destination based on the computed sum of the number of channels carried by the current and all preceding destinations, step 206, FIG. 3.

For system 10, FIG. 1, the computed sum of the number of channels carried by the current and all preceding destinations of part a of step 206 yields:

TABLE 6

| Computed sum of channels carried by preceding destinations | |
|---|---|
| Source I.D. | Sum |
| S0 | 2 |
| S1 | 3 |
| S2 | 7 |
| S3 | 8 |

TABLE 6-continued

Computed sum of channels carried by preceding destinations

| Source I.D. | Sum |
|---|---|
| S4 | 10 |
| S5 | 11 |
| S6 | 12 |
| S7 | 12 |
| S8 | 12 |

For system 10 FIG. 1, the computed destination identifier of the first channel sent to destinations 0-8 of part b of step 206 yields:

TABLE 7

Destination Identifiers

| Destination I.D. | First channel sent to destination |
|---|---|
| DI0 | 0 |
| DI1 | 2 |
| DI2 | 3 |
| DI3 | 7 |
| DI4 | 8 |
| DI5 | 10 |
| DI6 | 11 |
| DI7 | N/A |
| DI8 | N/A |

As shown in Table 7, destination 0 has a destination identifier, DIO, equal to 0, which means the first channel sent to destination 0 is channel 0, indicated at 62, FIG. 1. Destination 1 has a destination identifier, D11, equal to 2 which means the first channel sent to destination 1 is channel 2, indicated at 64. Destination 2 has a destination identifier, DI2, equal to 3 which means the first channel sent to destination 2 is channel 3, indicated at 68. Destination 3 has a destination identifier, DI3, equal to 7, which means the first channel sent to destination 3 is channel 7, indicated at 80. Destination 4 has a destination identifier, DI4, equal to 8, which means the first channel sent to destination 4 is channel 8, indicated at 96. Destination 5 has a destination identifier, DI5, equal to 10, which means the first channel sent to destination 5 is channel 10, indicated at 99. Destination 6 has a destination identifier, DI6, equal to 11, which means the first channel sent to destination 7 is channel 11, indicated at 101.

Exemplary pseudo-code for the computed sum of channels for the current and all preceding channel destinations determined by part a of step 206:

```
Compute sum of channels in all preceding channel destinations,
including current destination: S0 to S(B−1)
S0    = N0
S1    = N0 + N1
S2    = N0 + N1 + N2
...
S(B−1)      = N0 +N1 + N2 + .... + N(B−1)
```

where B is the number of destination in the system, e.g., B=9 for system 10, FIG. 1, and $N_x$ is the number of channels on each destination. For system 10, destination 0 carries two channels, therefore N0=2, destination 1 carries one channel, therefore N1=1, destination 2 carries four channels, therefore N2=4, destination 3 carries one channel, therefore N3=1, destination 4 carries two channels, therefore N4=2, destination 5 carries one channel, therefore N5=1, and destination 6 carries one channel, therefore N6=1. Destinations 7-8 are not used; therefore, N7 and N8 do not apply.

Exemplary pseudo-code for computing the destination identifier of the first channel sent to each destination determined by part b of step 206 is shown by:

```
Compute the destination identifier (DI)
  DI0 to DI(B−1)
  DI0 = 0
  DI1 = S0
  DI2 = S1
  ...
  DI(B−1) = S(B−2)
```

where B is the number of destinations in the system, e.g., B=9 for system 10, and S is the previously computed sum of the number of channels carried by all preceding destinations, e.g., as shown in Table 6.

Once the destination for each of the channels has been identified, the channel ordering must be determined. No computations are needed for this step as the channels are arranged in ascending numerical order. When a destination carries more than one channel, the order in which the channels are carried must be determined. In the example shown for system 10, FIG. 1, destination 0 carries two channels, channels 0 and 1, indicated at 62 and 63. Therefore, section 0 carries channel 0 and section 1 carries channel 1, as shown at 100. Destination 2 carries four channels, channels 3, 4, 5, and 6, indicated at 68, 69, 71, and 73, respectively, therefore, section 0 carries channel 3, section 1 carries channel 4, section 2 carries channel 5, and section 3 carries channel 6, as shown at 102. Destination 4 carries two channels, channels 8 and 9, indicated at 96 and 98. Therefore, section 0 carries channel 8 and section 1 carries channel 9, indicated at 104.

The result is the method of apportioning channels in a multi-source, multi-destination system of this invention has determined the destinations for each of channels 0-11. Therefore, if the number of channels carried by any particular destination changes, e.g., as discussed above with reference to FIG. 2, the claimed method of apportioning channels as shown in FIG. 3 can accommodate the changes and map channels 0-11 to destinations 0-8.

As shown above, the method of apportioning channels in a programmable multi-source, multi-destination system of this invention effectively apportions and maps channels 0-11 from sources 0-8 to destinations 0-8. Any changes made to the number of channels carried by any of sources 0-8 and/or the number of channels carried by destination 0-8 are accommodated by the method of apportioning channels of this invention.

In a preferred embodiment, the method of apportioning channels in a programmable multi-source, multi-destination system of this invention is implemented on a processor, such as an audio DSP processor, e.g., an ADAU-1441 DSP processor available from Analog Devices, Inc. (Wilmington, Mass.). The audio DSP processor may include 24 channels and receive from 9 sources and send to 9 destinations, although the processor may include any number of channels and receive from any number of sources and send to any number of destinations. The method of apportioning channels in a programmable multi-source, multi-destination system of this invention may be implemented on an ASIC. The ASIC may be designed using any hardware description language (HDL) such as Verilog® 2001 or any HDL as known to those skilled in the art which generates all the necessary hardware and logic designs for method 200. The ASIC or the DSP may be programmed using a programming language, e.g., C, $C^{++}$, or any programming language known to those skilled in the art.

Figure 4:
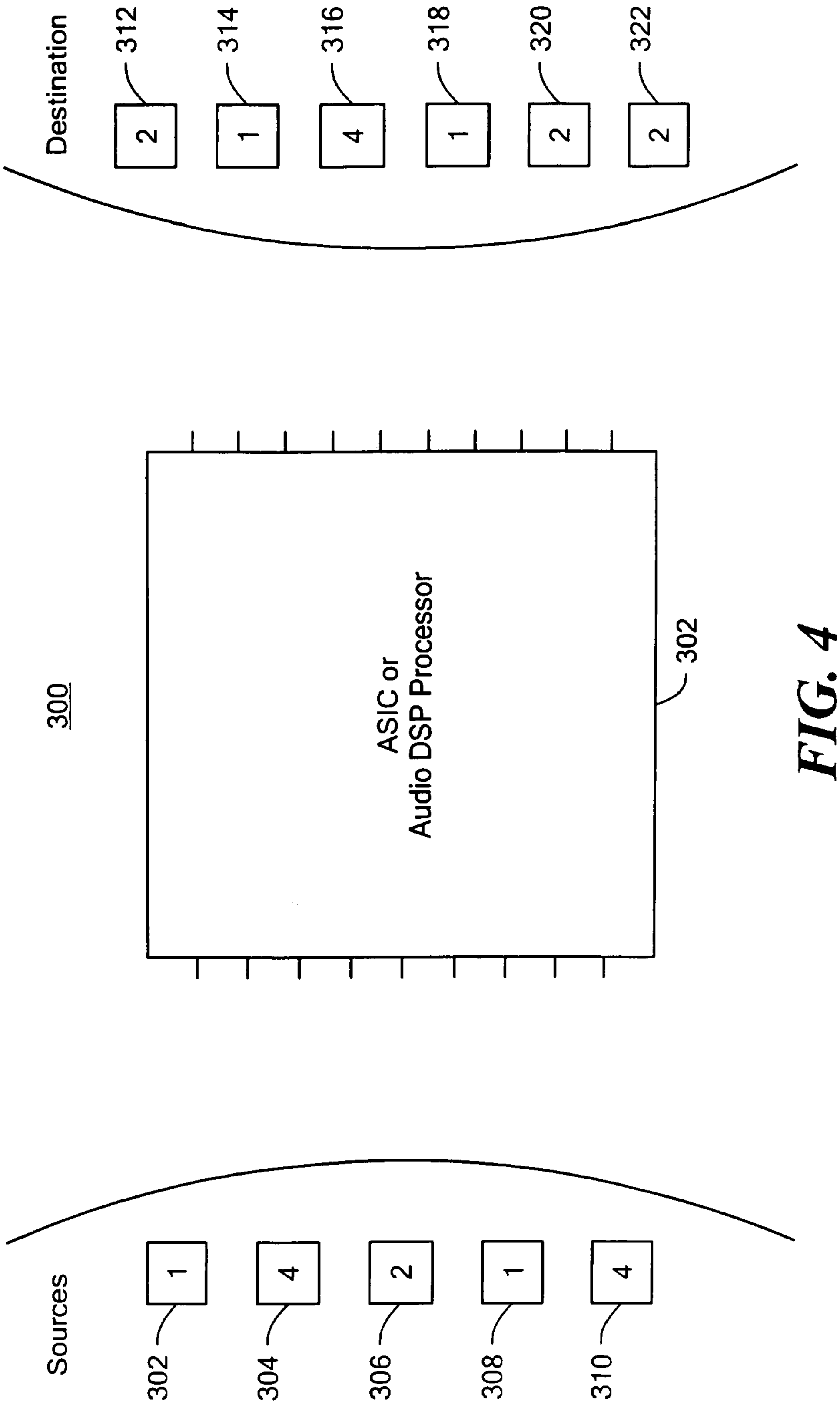
FIG. 4 is a schematic block diagram showing one embodiment of a system for apportioning channels in a programmable multi-source, multi-destination system in accordance with this invention.

System 300, FIG. 4, for apportioning channels in a programmable multi-source, multi-destination system of this invention, includes processor 302 configured to determine the source for each channel by a) computing the sum of the number of channels carried by the current and preceding sources, and b) computing the source identifier of each channel based on the computed sum of the number of channels carried by the current and preceding sources, similar as discussed above with reference to the method of apportioning channels as discussed above with reference to FIG. 3. Processor 302, FIG. 4, is also configured to determine which section of the source each channel is located based on the computed source identifier, similar as discussed above. Processor 302 is also configured to determine the destination for each channel by a) computing the sum of the number of channels carried by the current and all preceding destinations and b) computing the destination identifier of the first channel sent to each destination based on the computed sum of the number of channels carried by the current and all preceding destinations, similar as discussed above with reference to FIG. 3.

Processor 300 may be an ASIC or an audio DSP designed using a hardware description language, e.g., Verilog® 2001, or similar type HDL known to those skilled in the art which generates all the hardware and logic designs needed for system 300. The audio DSP processor may include an ADAU-1441, as discussed above. Processor 300 may be any processor known to those skilled in the art that is able to carry out simple mathematical operations which can be programmed to implement the method of apportioning channels in a programmable multi-source, multi-destination system in accordance with this invention. Processor 300 may be programmed using any desired programming language, e.g., C, $C^{++}$ or any programming language known to those skilled in the art. In this example, system 300, receives data from multiple sources, e.g., sources 302, 304, 306, 308, and 310 in which the number of channels carried by each source is indicated within the associated box for each source. System 300 also sends data to multiple destinations, e.g., destinations 312, 314, 316, 318, 320 and 322 wherein the associated number of channels carried by each destination is indicated within the associated box for the destination. System 300 may include 12 channels as shown on FIGS. 1 and 2 with nine sources and nine destinations. However, this is not a necessary limitation of this invention as system 300 may have any number of channels, sources, and destinations as known by those skilled in the art.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method for apportioning channels in a programmable multi-source, multi-destination system comprising:

determining the source for each channel by:
- a) computing the sum of the number of channels carried by the current and all preceding sources;
- b) computing a source identifier for each channel based on the computer sum of the number of channels carried by the current and all preceding sources;

determining which section of the source the channel is located based on the computed source identifier; and determining the destination for each channel by:
- a) computing the sum of the number of channels carried by the current and all preceding destinations, and
- b) computing a destination identifier of a first channel sent to each destination based on the computed sum of the number of channels carried by the current and all preceding destinations.

2. The method of claim 1 in which the method is implemented on a processor.

3. The method of claim 2 in which the method is implemented on an audio DSP processor.

4. The method of claim 2 in which the method is implemented on an ASIC.

5. The method of claim 4 in which the ASIC is designed using a hardware description language.

6. The method of claim 4 in which the ASIC and/or the audio DSP is programmed using a programming language.

7. A computer-implemented method for apportioning channels in a programmable multi-source, multi-destination system comprising:

determining the source for each channel using a processor programmed to perform the steps of:
- a) computing the sum of the number of channels carried by the current and all preceding sources;
- b) computing a source identifier for each channel based on the computed sum of the number of channels carried by the current and all preceding sources; and determining by the processor which section of the source the channel is located based on the computed source identifier.

8. A method for apportioning channels in a programmable multi-source, multi-destination system comprising:

determining the destination for each channel by:
- a) computing the sum of the number of channels carried by the current and all preceding destinations, and
- b) computing a destination identifier of a first channel sent to each destination based on the computed sum of the number of channels carried by the current and all preceding destinations.

9. A system for apportioning channels in a programmable multi-source, multi-destination system comprising:

a processor configured to:

determine the source for each channel by:
- a) computing the sum of the number of channels carried by the current and all preceding sources;
- b) computing a source identifier for each channel based on the computed sum of the number of channels carried by the current and all preceding sources;

determine which section of the source the channel is located based on the computed source identifier; and determine the destination for each channel by:

a) computing the sum of the number of channels carried by the current and all preceding destinations, and b) computing a destination identifier of a first channel sent to each destination based on the computed sum of the number of channels carried by the current and all preceding destinations.

10. The system of claim 9 in which the processor includes an ASIC.

11. The system of claim 10 in which the ASIC includes an audio DSP.

12. The system of claim 10 in which the ASIC is designed using a hardware description language.

13. The system of claim 11 in which audio DSP is designed using a programming language.

14. A system for apportioning channels in a programmable multi-source, multi- destination system comprising:

a processor configured to:

determine the source for each channel by:

a) computing the sum of the number of channels carried by the current and all preceding sources;

b) computing a source identifier for each channel based on the computed sum of the number of channels carried by the current and all preceding sources; and determine which section of the source the channel is located based on the computed source identifier.

15. A system for apportioning channels in a programmable multi-source, multi-destination system comprising:

a processor configured to:

determine the destination for each channel by:

a) computing the sum of the number of channels carried by the current and all preceding destinations, and b) computing a destination identifier of a first channel sent to each destination based on the computed sum of the number of channels carried by the current and all preceding destinations.

* * * * *